United States Patent [19]

Hori et al.

[11] Patent Number: 4,612,818

[45] Date of Patent: Sep. 23, 1986

[54] LUBRICATING STRUCTURE OF DIFFERENTIAL CARRIER FOR VEHICLE

[75] Inventors: Hiroshi Hori; Kiyoshi Taniyama; Katumi Huruhata, all of Toyota, Japan

[73] Assignee: Toyota Jidosha Kabushiki Kaisha, Toyota, Japan

[21] Appl. No.: 690,265

[22] Filed: Jan. 10, 1985

[30] Foreign Application Priority Data

Feb. 1, 1984 [JP] Japan ............................. 59-15004

[51] Int. Cl.$^4$ ........................ F16H 57/04; F01M 11/02
[52] U.S. Cl. ............................................. 74/467; 184/6.12
[58] Field of Search ................... 74/467, 710; 184/6.12

[56] References Cited

U.S. PATENT DOCUMENTS

| 3,545,568 | 12/1970 | LaCoste | 74/467 |
| 4,018,097 | 4/1977 | Ross | 74/467 |
| 4,271,717 | 6/1981 | Millward et al. | 74/606 R |

FOREIGN PATENT DOCUMENTS 807832 1/1959 United Kingdom ............... 184/6.12

Primary Examiner—Kenneth J. Dorner
Assistant Examiner—Mike Bednarek
Attorney, Agent, or Firm—Oblon, Fisher, Spivak, McClelland & Maier

[57] ABSTRACT

A lubricating structure of a differential carrier includes a drive pinion shaft attaching portion, an oil supply hole and an oil return hole extended respectively along and provided on both sides of the attaching portion and a ring gear attaching portion formed to extend the axis of a ring gear in the direction crossing these holes. A gap between a portion located on the lower side of the oil supply hole in a member surrounding the ring gear attaching portion and the ring gear disposed in the attaching portion is formed so as to be larger than that between a portion located on the upper side of the oil supply hole in the member and the ring gear. The oil supply hole is formed to give an inclination downward in front when the differential carrier is mounted on a car body.

4 Claims, 6 Drawing Figures

LUBRICATING STRUCTURE OF DIFFERENTIAL CARRIER FOR VEHICLE

BACKGROUND OF THE INVENTION

1. Field of the Invention

This invention relates to a lubricating structure of a differential carrier for a vehicle, and more particularly to a lubricating structure of a so-called side hole type differential carrier provided on a side wall thereof with an oil supply hole and an oil return hole.

2. Description of the Prior Art

In a side hole type differential carrier, particularly in that provided on both sides of a drive pinion shaft attaching portion with an oil supply hole and an oil return hole extending along said attaching portion, oil scraped up by a ring gear opposed to the oil supply hole is conducted to the front of the drive pinion shaft attaching portion through the oil supply and then circulated to return to a ring gear attaching portion through the oil return hole.

Conventionally, a portion located on the lower side of said oil supply hole and a portion located on the upper side of said oil supply hole in a member surrounding the ring gear attaching portion are formed to have some gaps spaced from the ring gear disposed in the ring gear attaching portion.

Though not directly related to said gaps, the differential carrier is mounted so as to be inclined upward in front on a car body, while the oil supply hole is conventionally formed substantially parallel to or inclined slightly downward in front to a drive pinion shaft.

SUMMARY OF THE INVENTION

Since the gaps between the ring gear and the upper and lower portions of the member are the same, oil scraped up by the ring gear is difficult to be introduced into the oil supply hole particularly when the ring gear is rotated in the direction of reverse drive of a vehicle.

Also, when the differential carrier is mounted on the car body, the oil supply hole is located approximately horizontally or inclined upward in front, so that as the inclination angle at which the differential carrier is mounted is made larger, it is more difficult for the oil scraped up by the ring gear to reach the neighborhood of a front bearing of a pair of bearings arranged in front and rear portions of the drive pinion shaft attaching portion for supporting the drive pinion shaft. As a result, lubrication of the front bearing tends to be insufficient.

Accordingly an object of the present invention is to provide a lubricating structure of a differential carrier which facilitates the supply of oil to an oil supply hole.

A further object of the present invention is to provide a lubricating structure of a differential carrier capable of forcibly sending oil to the neighborhood of a front bearing.

According to the present invention, there is provided a lubricating structure of a differential carrier comprising a drive pinion shaft attaching portion, an oil supply hole and an oil return hole extended respectively along and provided on both sides of the attaching portion and a ring gear attaching portion formed to extend the axis of a ring gear in the direction of crossing these holes.

A gap between the ring gear disposed in the ring gear attaching portion and a portion located on the lower side of said oil supply hole in a member surrounding said ring gear attaching portion is formed so as to be larger than that between the ring gear and a portion located on the upper side of said oil supply hole in said member. Separately from this structure, or together with this structure, said oil supply hole is formed so as to be inclined downward in front when said differential carrier is mounted on a car body.

According to the present invention, by making the size of the gaps between two portions of the member surrounding the ring gear attaching portion and the ring gear similar, a hole surface surrounding the oil supply hole and located on the upper side thereof will project into the ring gear attaching portion longer than that located on the lower side. As a result, since oil scraped up by the ring gear is splashed from above when the ring gear is rotated in the direction of forward drive of a vehicle, the oil is liable to enter the oil supply hole. Also, when the ring gear is rotated in the direction of reverse drive of the vehicle, the oil scraped up by the ring gear is splashed upward from below to abut against the hole surface on the upper side of the oil supply hole so that the oil is apt to be introduced in the oil supply hole.

According to the present invention, since oil entering the oil supply hole is forcibly sent to the front bearing and an oil seal, the bearing and the oil seal are smoothly lubricated and the front bearing is prevented from seizure or the like. Also, no special members are provided for conducting oil to an oil supply path, high cost can be avoided.

Other objects and features of the present invention will become apparent from the following description of a preferred embodiment of the invention with reference to the accompanying drawings.

DESCRIPTION OF THE PREFERRED EMBODIMENT

Figure 1:
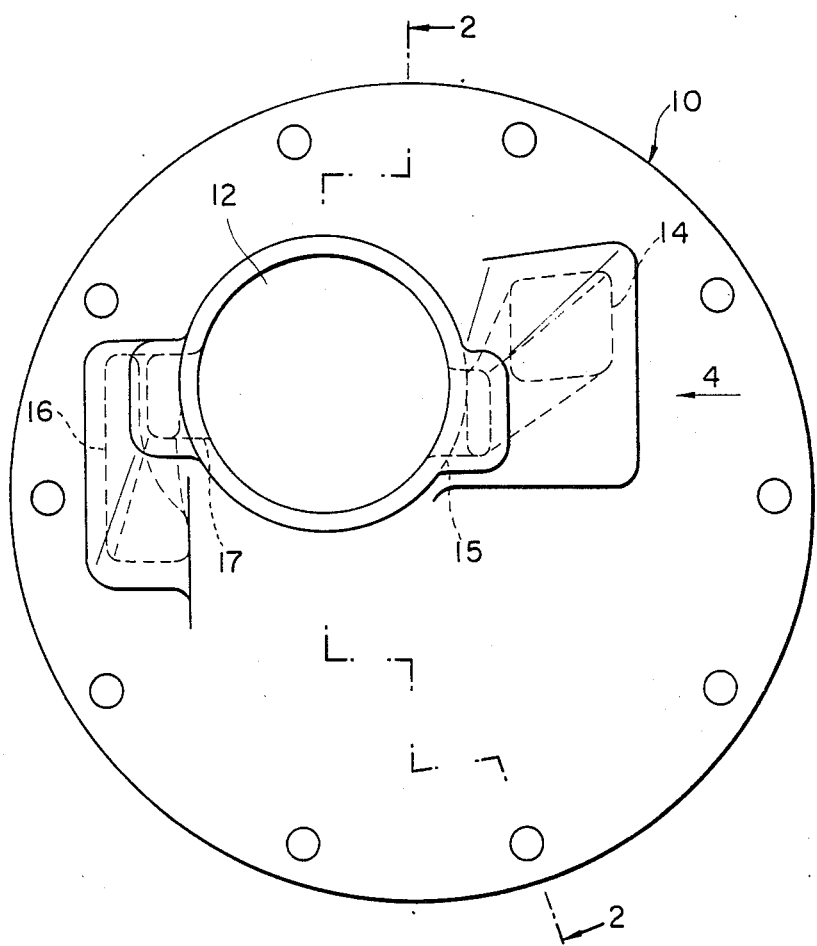
FIG. 1 is a front view of a differential carrier.
Figure 2:
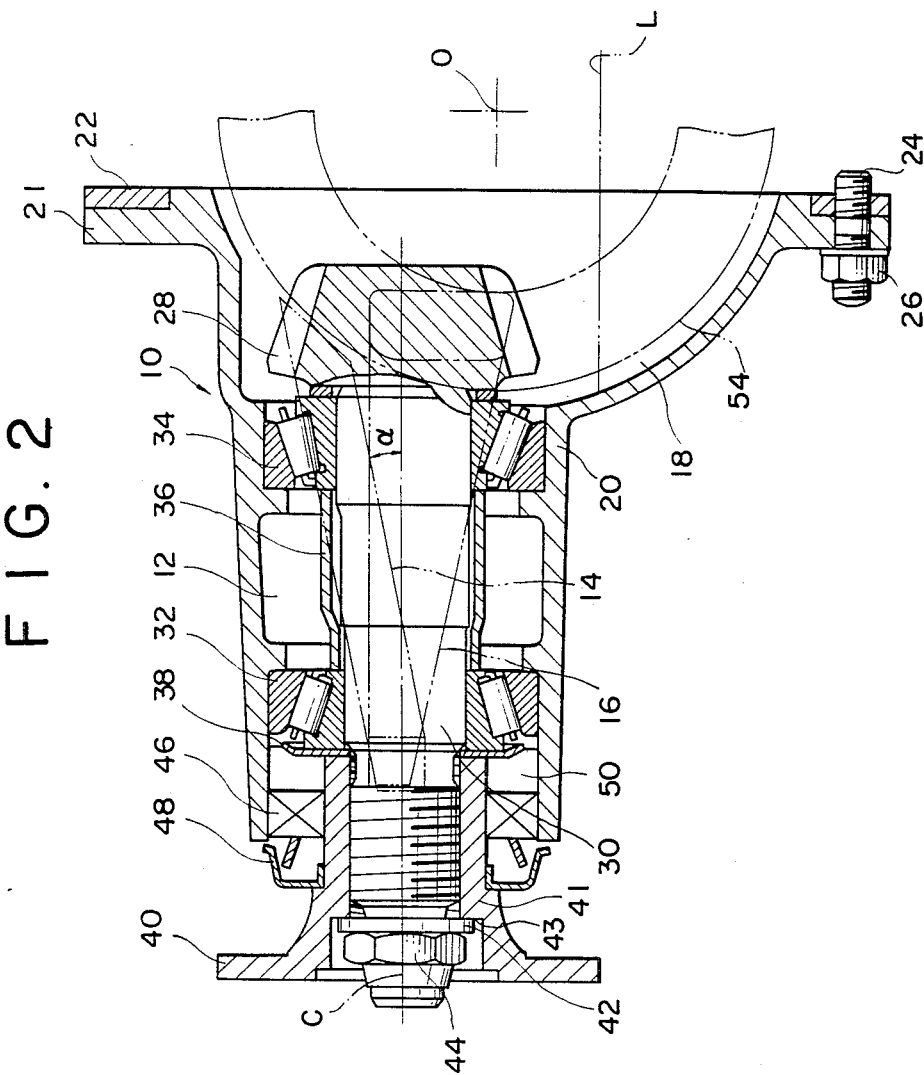
FIG. 2 is a sectional view taken along the line 2—2 of FIG. 1, showing a drive pinion shaft disposed in a drive pinion shaft attaching portion.
Figure 3:
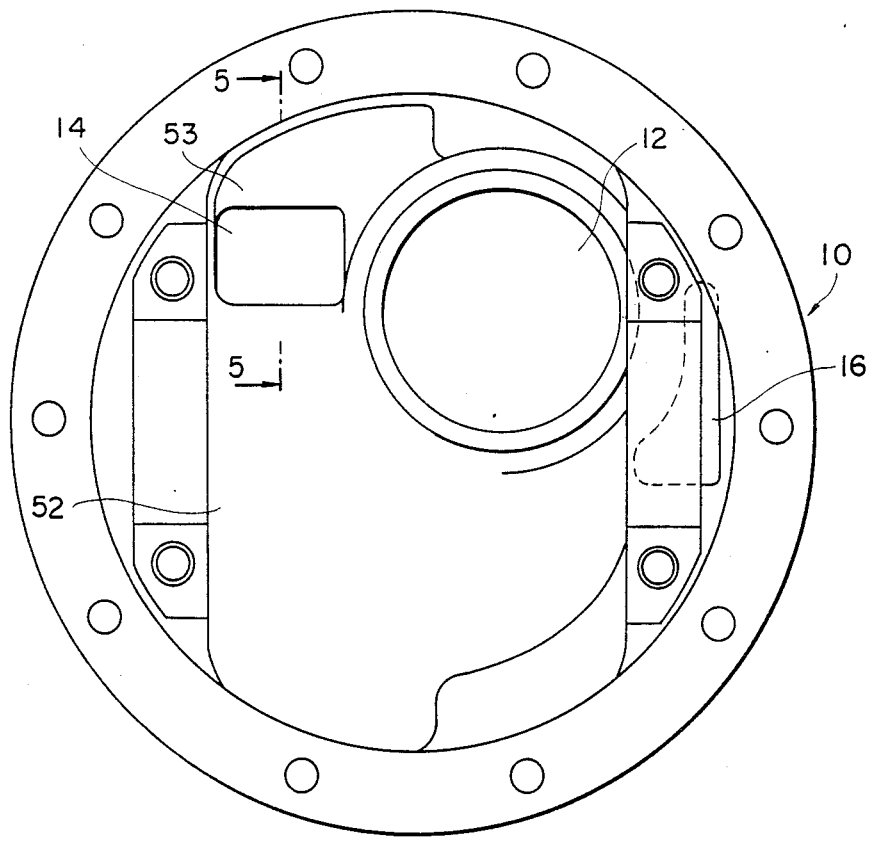
FIG. 3 is a rear view of the differential carrier.

As is shown in FIGS. 1 to 3, the present invention relates to a structure for a lubricating oil from a ring gear attaching portion 18 to a side hole type lubricating path in a differential carrier 10, i.e. lubricating path constituted from an oil supply hole 14 and an oil return hole 16 provided on both sides of and extended along a drive pinion shaft attaching portion 12.

A housig member 20 is formed with the drive pinion attaching portion 12, the oil supply hole 14, the oil return hole 16 and a portion of the ring gear attaching portion 18 such that the axis 0 of a ring gear extends to cross the drive pinion shaft attaching portion 12, the oil supply hole 14 and the oil return hole 16. An embodiment shown in the drawing is of so-called reverse offset type in which the axis C of a drive pinion shaft is offset above the axis 0 of the ring gear. After the drive pinion shaft and other parts are incorporated as will be later described, this housing member 20 is coupled with a main body for receiving a differential gear assembly by bolts 24 and nuts 26 with a gasket 22 being applied to the flange 21 of the member to constitute the differential carrier. Since the construction of the main body and the coupling itself are known per se and not related directly with the present invention, they are not shown in the drawing.

As shown in FIG. 2, two bearings 32, 34 spaced from each other forward and backward are fitted in the drive pinion shaft attaching portion 12, and in these bearings 32, 34 is fitted rotatably a drive pinion shaft 30 having a drive pinion 28 on the rear end. A tubular spacer 36 spans between the inner races of both bearings, and an oil slinger 38 is located at the front side of the bearing 32. A tubular portion 41 of a companion flange 40 is fitted on an end of the drive pinion shaft 30. A lock nut 44 is screwed onto the drive pinion shaft 30 through a washer 42 which is abutted to a shoulder 43 of the companion flange 40. The lock nut 44 is tightened to fix the companion flange 40 to the drive pinion shaft 30. An oil seal 46 is disposed on the front end of the attaching portion 12, and further a dust deflector 48 is disposed in the front of the oil seal 46 to incorporate the drive pinion shaft 30 in the attaching portion 12.

The oil supply hole 14 supplies oil to a space 50 surrounded by the front bearing 32 and the oil seal 46. The oil supply hole 14 extends from the ring gear attaching portion 18 toward a position opposed to the front space 50 and communicates with the space 50 through the hole portion 15 provided diametrically in said position.

Figure 5:
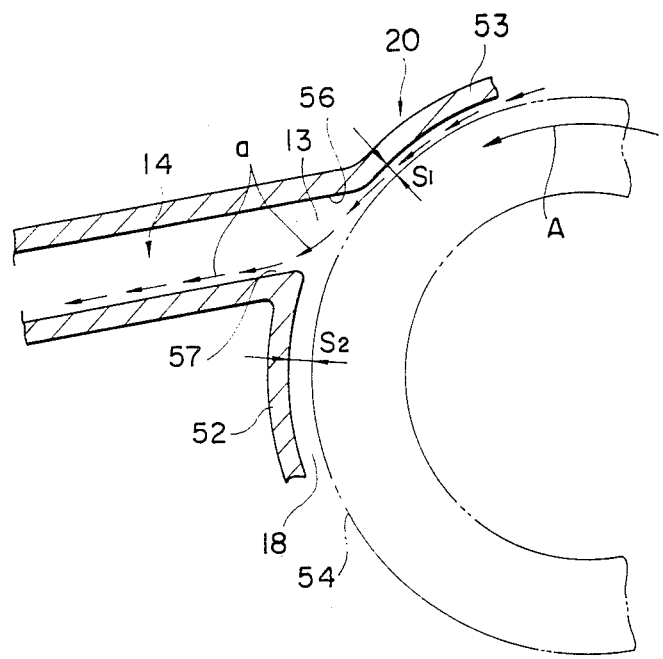
FIGS. 5 and 6 are sectional views taken along the line 5—5 of FIG. 3, showing an inlet portion of an oil supply hole.

The inlet 13 of the oil supply hole 14 is formed as shown in FIG. 5. That is, a space S2 between a ring gear 54 disposed in said attaching portion 18 and a portion 52 located on the lower side of the oil supply hole 14 in said member 20 surrounding the ring gear attaching portion 18 is formed larger than space $S_1$ between the ring gear 54 and a portion 53 located on the upper side of the oil supply hole 14 in said member 20. As a result, a hole surface 56 surrounding the oil supply hole 14 and located on the upper side will project further than hole surface 57 located on the lower side into the ring gear attaching portion 18.

Figure 4:
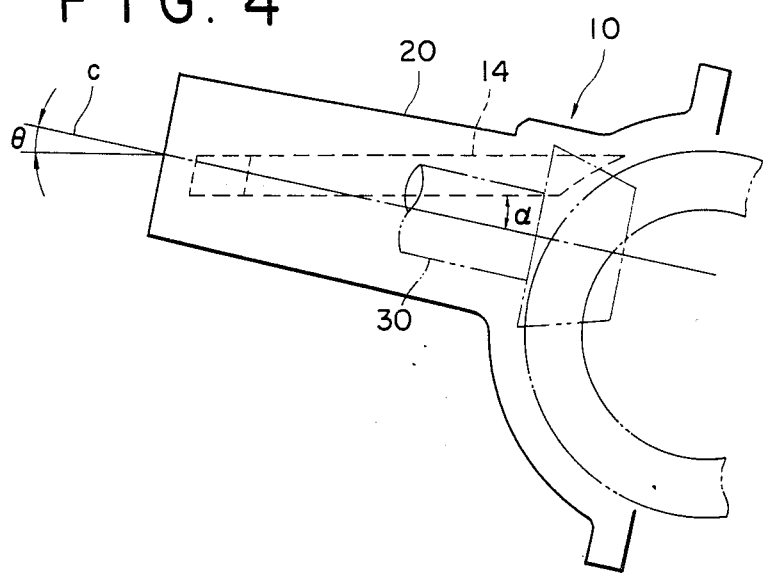
FIG. 4 is a side view of the differential carrier as viewed in the direction 4 of FIG. 1, showing the differential carrier mounted on a car body.

The oil supply hole 14 is inclined relative to the axis C of the drive pinion shaft 30. An inclined angle $\alpha$ made between the axis C of the drive pinion shaft 30 and a lower hole surface of the oil supply hole 14, as shown in FIG. 4, is determined such that its absolute value is increased in the opposite direction to an inclined angle $\theta$ between the axis C of the drive pinion shaft 30 and a horizontal plane when the differential carrier 10 is mounted on the car body. As a result, the oil supply hole 14 has an inclination downward towards the front of the vehicle when the differential carrier 10 is mounted on the car body.

The oil return hole 16 returns oil in the space 50 to the ring gear attaching portion 18. The oil return hole 16 is provided on the opposite side of the oil supply hole 14 so that the drive pinion shaft attaching portion 12 is sandwiched by both of said holes. The oil return hole 16 extends from a position opposed to the space 50 toward the ring gear attaching portion 18 and communicates to the space 50 through a hole portion 17 (FIG. 1) provided diametrically in said position. Operation of Preferred Embodiment The ring gear 54 is disposed in the ring gear attaching portion 18 and the member 20 is coupled with the main body portion to seal oil in the ring gear attaching portion 18. In this case, when the differential carrier is placed horizontally, the amount of oil is determined such that the level L of oil is below the drive pinion shaft 30 as shown in FIG. 2. When the differential carrier 10 is mounted on the car body, the differential carrier 10 has an inclination upward toward the front of the vehicle as shown in FIG. 4. The oil supply hole 14 is then directed downward towards front of the vehicle.

Figure 6:
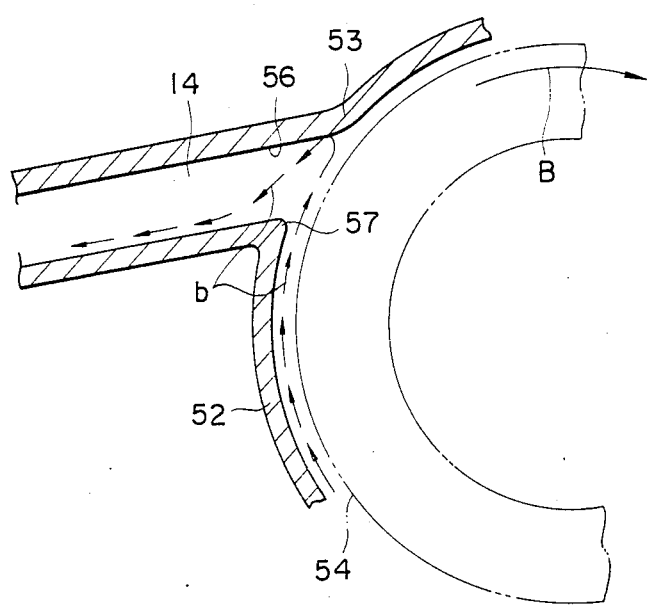

When the vehicle advances, the ring gear 54 driven by the drive pinion 28 is rotated in the direction of arrow A in FIG. 5, and oil scraped up by the ring gear 54 will enter the oil supply hole 14 from above as shown by the arrow a, so that the introduction of oil into the oil supply hole 14 is easy. Next, when the vehicle retreats, the ring gear 54 is rotated in the direction of arrow B shown in FIG. 6, and oil scraped up by the ring gear 54 abuts against and springs back from the upper hole surface 56 so as to be introduced into the oil supply hole 14 as shown by the arrow b in FIG. 6. Also in this case, the introduction of oil is easy, as compared with the case of the hole surface 56 provided with the same projecting length as the lower side hole surface 57.

The oil introduced into the oil supply hole 14 forcibly flows forward and reach the space 50 since the oil supply hole 14 is inclined downward in front. The oil in the space 50 lubricate the front bearing 32 and the oil seal 46 and then returns to the ring gear attaching portion 18 through the oil return hole 16. Here, oil scraped up by the ring gear 54 is conducted directly to the rear bearing 34 for lubrication.

While said embodiment is of a reverse offset type in which the axis of the drive pinion shaft is offset above the axis of the ring gear and the most preferable one of the present invention in which the lubrication of the front bearing is the hardest due to the restriction of oil amount or the like, the present invention, however, is to be applied to all lubricating structures of the side hole type differential carrier without being limited to the reverse offset type.

The aforementioned description concerns mainly a lubricating structure of a differential carrier for a rear wheel, while the present invention may apply to that for a front wheel. Obviously, numerous modifications and variations of the present invention are possible in light of the above teachings. It is therefore to be understood that within the scope of the appended claims, the invention may be practiced otherwise than as specifically described herein.

What is claimed is:

1. A lubricating structure of a differential carrier for a vehicle having a ring gear, comprising:
   a housing;
   a drive pinion shaft attaching portion located in said housing wherein a single oil supply hole and an oil return hole extend respectively along and are provided on opposite sides of the drive pinion shaft attaching portion;
   a ring gear attaching portion extending along an axis of said gear and which is disposed in a direction crossing an axis of said drive pinion shaft attaching portion;
   a first portion of said housing being located on a lower side of said single oil supply hole, an inner surface thereof extending from a lower surface of said oil supply hole and formed substantially coaxially with the ring gear; and
   a second portion of said housing located on an upper side of said oil supply hole, an inner surface thereof extending from an upper surface of said oil supply hole, formed substantially coaxially with the ring gear and having a smaller diameter than that of the inner surface of said first portion such that an oil hitting portion is formed at an upper surface of said oil supply hole by the difference in diameter of the inner surfaces of said first and second portions.

2. A lubricating structure of a differential carrier for a vehicle as claimed in claim 1, wherein the axis of said drive pinion shaft is offset above the axis of said ring gear.

3. A lubricating structure of a differential carrier of a vehicle having a ring gear, comprising:
   a housing;
   a drive pinion shaft attaching portion located in said housing wherein a single oil supply hole and an oil return hole extend respectively along and are provided on opposite sides of said attaching portion;
   a ring gear attaching portion extending along an axis of said ring gear in a direction crossing said drive pinion shaft attaching portion and wherein said single oil supply hole is formed so as to be inclined downwardly;
   a first portion of said housing being located on a lower side of said single oil supply hole, an inner surface thereof extending from a lower surface of said oil supply hole and formed substantially coaxially with the ring gear; and
   a second portion of said housing being located on an upper side of said oil supply hole, an inner surface thereof extending from an upper surface of said oil supply hole, formed substantially coaxially with the ring gear and having a smaller diameter than that of the inner surface of said lower side portion such that an oil hitting portion is formed at an upper surface of said oil supply hole by the difference in diameter of the inner surfaces of said first and second portions.

4. A lubricating structure of a differential carrier for a vehicle as claimed in claim 3, wherein the axis of said drive pinion shaft is offset above the axis of said ring gear.

* * * * *